United States Patent [19]
Mohri

[11] Patent Number: 5,213,197
[45] Date of Patent: May 25, 1993

[54] BELT CLEANER FOR CONVEYOR

[75] Inventor: Toyoshige Mohri, Osaka, Japan

[73] Assignee: Horyo Corporation, Osaka, Japan

[21] Appl. No.: 791,669

[22] Filed: Dec. 14, 1991

[30] Foreign Application Priority Data

Nov. 15, 1990 [JP] Japan .................................. 2-311001
Dec. 25, 1990 [JP] Japan .................................. 2-405970
Mar. 22, 1991 [JP] Japan .................................. 3-59106

[51] Int. Cl.$^5$ .............................................. B65G 45/16
[52] U.S. Cl. .................................................. 198/499
[58] Field of Search ................................ 198/499, 497

[56] References Cited

U.S. PATENT DOCUMENTS

| | | | |
|---|---|---|---|
| 4,290,520 | 9/1981 | Rhodes | 198/499 |
| 4,825,997 | 5/1989 | Bowman et al. | 198/499 |
| 4,838,409 | 6/1989 | Rappen | 198/497 |
| 4,936,439 | 6/1990 | Alexander, Jr. et al. | 198/499 |
| 5,031,750 | 7/1991 | Barnes | 198/497 X |
| 5,048,667 | 9/1991 | Morin | 198/499 |

FOREIGN PATENT DOCUMENTS

| | | | |
|---|---|---|---|
| 3624623 | 3/1987 | Fed. Rep. of Germany | 198/499 |
| 0582153 | 11/1977 | U.S.S.R. | 198/499 |
| 2053121 | 2/1981 | United Kingdom | 198/499 |
| 8404516 | 11/1984 | World Int. Prop. O. | 198/499 |
| 8800916 | 2/1988 | World Int. Prop. O. | 198/499 |

Primary Examiner—Robert P. Olszewski
Assistant Examiner—James R. Bidwell
Attorney, Agent, or Firm—Armstrong, Westerman, Hattori, McLeland & Naughton

[57] ABSTRACT

A belt cleaner for a belt conveyor comprising a vertical blade member having at its upper end a scraper blade to be pressed against the lower surface of the belt at the starting end of a return path of travel of the belt, a device for holding the blade member upwardly and downwardly movably, and a device for applying pressure to the blade member held by the holding device. The pressure applying device has a hollow elastic body, and a device for supplying a pressure fluid to the interior of the elastic body under variable pressure.

15 Claims, 18 Drawing Sheets

BELT CLEANER FOR CONVEYOR

BACKGROUND OF THE INVENTION

The present invention relates to belt cleaners for use with belt conveyors for transporting iron ore, cement, coal, coke or like material for removing the material remaining on and adhering to the surface of the belt conveyor.

Heretofore known as such belt cleaners are those having a scraper plate which is pressed against the belt by elastic means such as a spring or rubber member for scraping off the remaining material, and those having a rotary brush which is brought into contact with the belt for removing the remaining material.

The cleaner of the scraper type frequently requires the adjustment of the position where the scraper plate is installed with the wear of the plate and therefore needs cumbersome work for the adjustment. Further if the belt has surface irregularities or undulates owing to vibration, the cleaner leaves the remaining material unremoved locally. When pressed against the belt with an excessive force, the scraper plate is likely to break the belt.

The cleaner of the rotary brush type encounters no problem if the remaining material is free-flowing but fails to completely remove the material if it is sticky. Another problem then arises in that the material once removed remains unreleased from the brush, revolves with the rotation of the brush and adheres to the belt again.

SUMMARY OF THE INVENTION

The main object of the present invention is to provide a belt cleaner which is free of the foregoing problems for use with belt conveyors.

The present invention provides a belt cleaner for a belt conveyor comprising a vertical blade member having at its upper end a scraper blade to be pressed against the lower surface of the belt at the starting end of a return path of travel of the belt, means for holding the blade member upwardly and downwardly movably, and means for applying pressure to the blade member held by the holding means. The pressure applying means has a hollow elastic body, and means for supplying a pressure fluid to the interior of the elastic body under variable pressure.

According to the present invention, the elastic body is inflated by supplying the pressure fluid thereto with the scraper blade of the blade member in contact with the belt, whereby the blade member is pressed against the belt with the pressure of the fluid. Accordingly, the pressure to be applied to the blade member can be easily adjusted merely by controlling the pressure of the pressure fluid.

Further even if the level of the blade member varies due, for example, to projections or indentations of the belt, the variation is absorbed by the elastic body, permitting the scraper blade to effectively remove the remaining material despite the presence of such irregularities.

When the blade member comprises a plurality of divided pieces arranged in contact with one another, the divided pieces are individually variable in level and therefore fittable, for example, to projections or indentations of the belt with greater ease.

According to an embodiment of the invention, the blade member has connected thereto one end of at least one lever, and the holding means has a horizontal tubular casing disposed horizontally away from the blade member and formed in its bottom with a guide groove having the other end of the lever fitted therein. When a plurality of levers are provided, the casing has guide grooves equal in number to the number of levers. The elastic body comprises a horizontal rubber tube closed at its opposite ends and housed in the casing so as to hold the other ends of the levers. The overall height of the cleaner is then approximately equal to the height of the blade member, so that the cleaner can be easily installed under the belt where only a limited space is usually available for installation.

The present invention further provides a belt cleaner for a belt conveyor comprising two vertical blade members each having at its upper end a scraper blade to be pressed against the lower surface of the belt at the starting end of a return path of travel of the belt, means for holding the blade members upwardly and downwardly movably as opposed to and spaced apart by a predetermined distance from each other in the direction of travel of the belt, and means for applying pressure to the blade members held by the holding means. The pressure applying means has a hollow elastic body, and means for supplying a pressure fluid to the interior of the elastic body under variable pressure.

For example when the belt undulates owing to vibration, the two blade members of this cleaner individually move upward and downward to follow the undulation, so that no portion of the remaining material will be left unremoved despite the undulation.

The scraper blade of each blade member comprises ceramic tiles, and the ceramic tiles of the two blade members are oriented toward the upstream side with respect to the direction of travel of the belt. The remaining material can be completely removed by this arrangement because even if the upstream blade member fails to completely scrape off the material, the remaining portion of the material can be scraped off by the downstream blade member.

The ceramic tiles of the upstream blade member may be oriented toward the upstream side, with the ceramic tiles of the downstream blade member oriented toward the downstream side. In the case where the belt travels in the usual direction, the material remaining on and adhering to the belt is scraped off by the upstream blade member, whereas in the case where the belt travels in the reverse direction, the remaining material is scraped off by the downstream blade member. Thus, the cleaner is usable for conveyors which are driven reversibly.

The ceramic tile joints of one of the blade members may be arranged out of register with those of the other blade member longitudinally of the blade members. The remaining material can then be reliably scraped off even if the material contains a large amount of water and is free-flowing since the portion of the material passing through the joint of one blade member is scraped off by the other blade member.

BRIEF DESCRIPTION OF THE DRAWINGS

FIG. 1 is a perspective view partly broken away, FIG. 2 is a cross sectional view, FIG. 3 is a view in a longitudinal section;

FIG. 4 is a perspective view corresponding to FIG. 1, FIG. 5 is across sectional view corresponding to FIG.

2, FIG. 6 is a view in longitudinal section corresponding to FIG. 3;

FIG. 7 is a perspective view corresponding to FIG. 1, FIG. 8 is a cross sectional view corresponding to FIG. 2, FIG. 9 is a view in longitudinal section corresponding to FIG. 3;

FIG. 10 is a perspective view corresponding to FIG. 1, FIG. 11 is a cross sectional view corresponding to FIG. 2, FIG. 12 is a view in longitudinal section corresponding to FIG. 3;

FIG. 13 is a perspective view corresponding to FIG. 1, FIG. 14 is a cross sectional view corresponding to FIG. 2, FIG. 15 is a view in longitudinal section corresponding to FIG. 3, FIG. 16 is a fragmentary plan view, FIG. 17 is a cross sectional view corresponding to FIG. 14 and showing a different mode of using blade members, and FIG. 18 is a perspective view corresponding to FIG. 13 and showing another mode of using blade members.

DESCRIPTION OF THE PREFERRED EMBODIMENTS

Embodiments of the invention will be described in detail below with reference to the drawings.

EMBODIMENT 1

Figure 1:
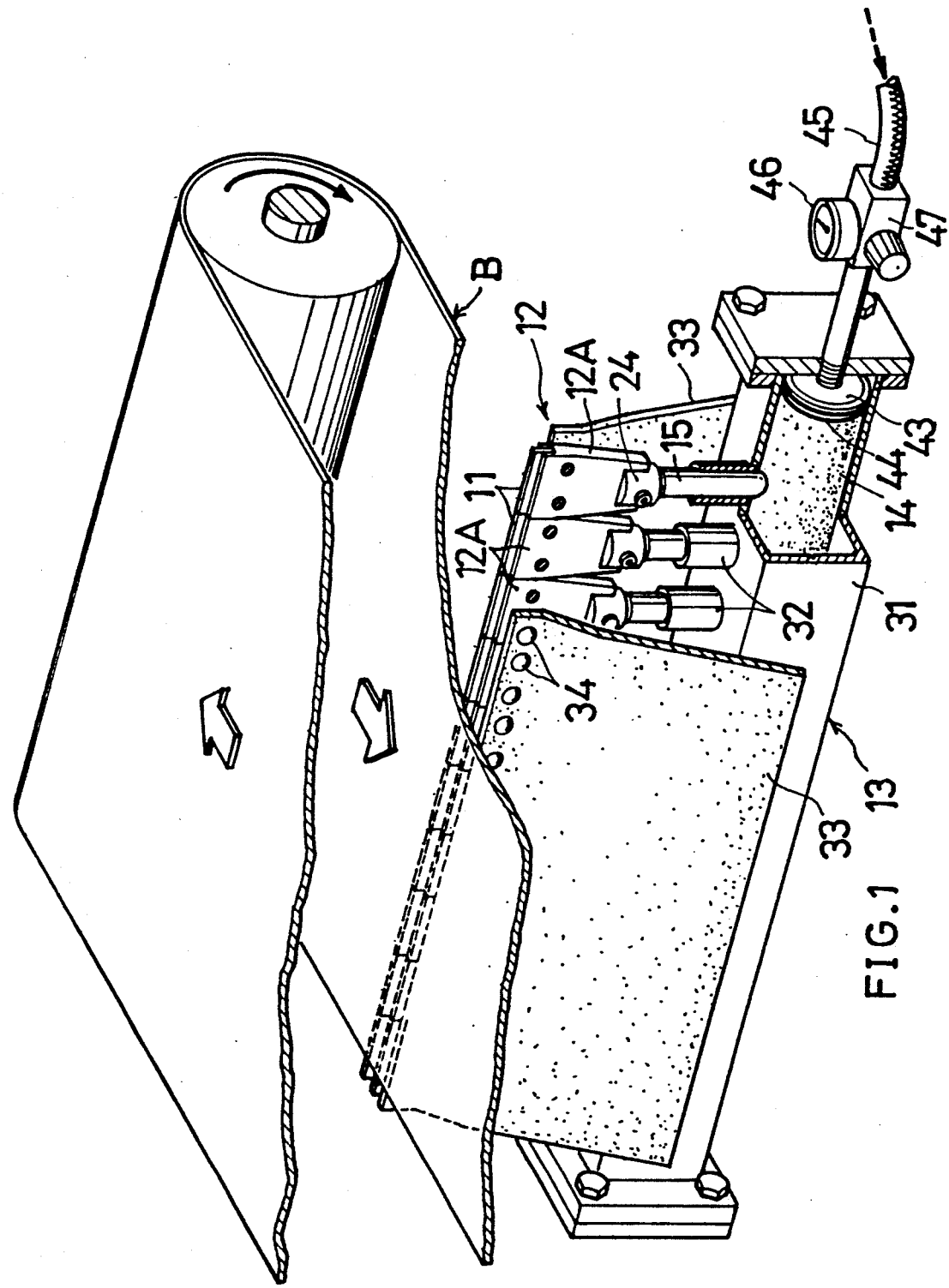
FIGS. 1 to 3 show an embodiment 1 of belt cleaner of the invention.
Figure 2:
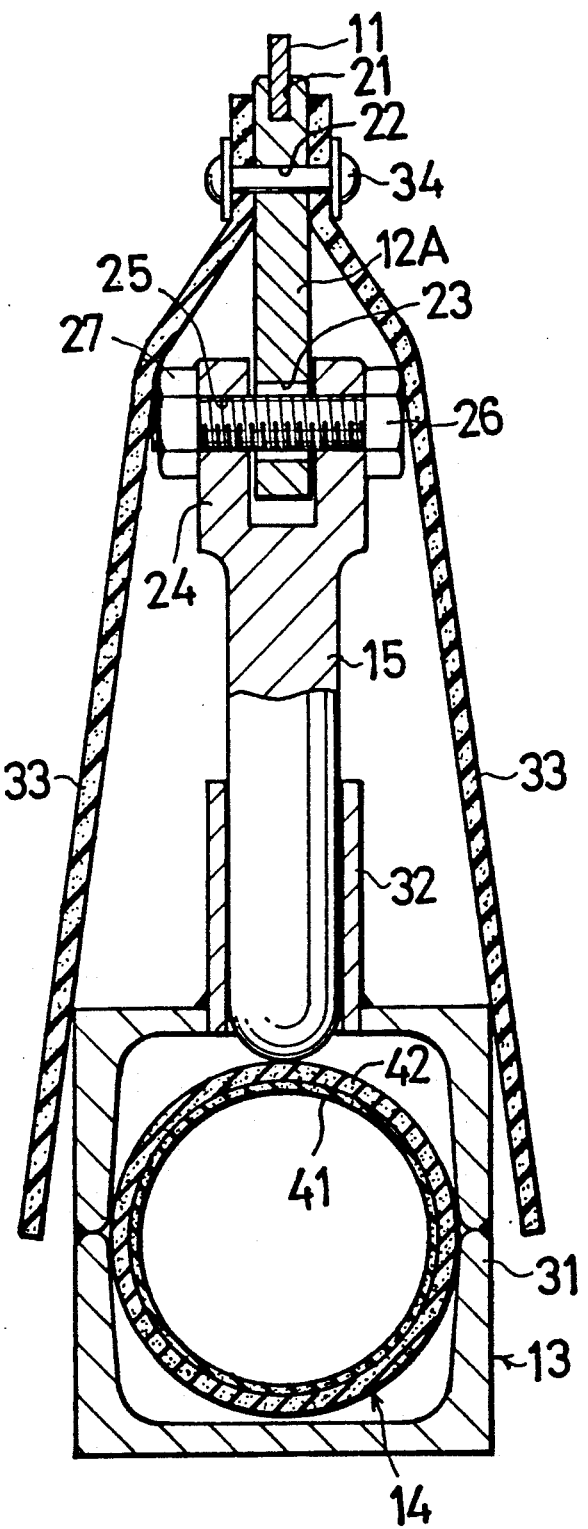
Figure 3:
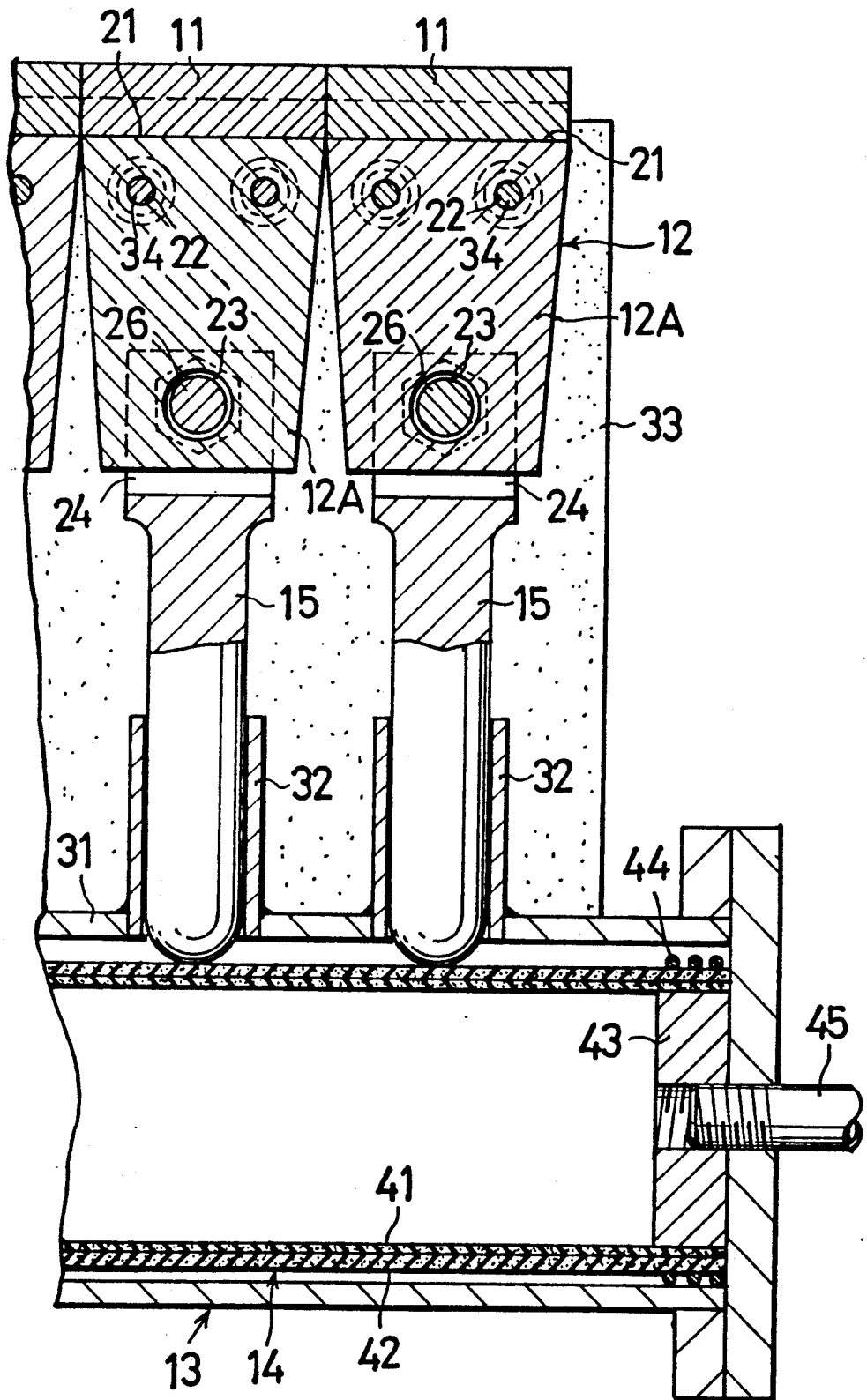

FIGS. 1 to 3 show a belt cleaner as an embodiment 1 which comprises a vertical blade member 12 disposed under the starting end of a return path of travel of a belt B, a holder 13 holding the blade member 12 upwardly and downwardly movably, a hollow elastic body 14 supporting the base end of the blade member 12 held by the holder 13, and supply means for supplying a pressure fluid to the interior of the elastic body 14 so as to inflate or contract the elastic body 14.

The blade member 12 comprises a plurality of divided pieces 12A each generally in the form of an inverted trapezoidal vertical plate and arranged side by side in contact with one another. Each of the divided pieces 12A is formed in its top with a groove 21 extending over the entire length thereof and having a scraper blade 11 fitted therein and brazed to the piece 12A. The scraper blade 11 is in the form of a strip having a length, for example, of 50 mm, and is made of a WC-Co cemented carbide. Alternatively, a ceramic chip is usable.

The divided piece 12A has two rivet holes 22 formed in an upper portion and arranged laterally, and a bolt hole 23 formed in a lower portion. The lower end of the divided piece 12A has connected thereto the upper end of a shank 15 in the form of a vertical rod. The shank 15 has at its upper end a bifurcated portion 24 formed with two bolt holes 25 coaxial with each other. With the bolt hole 23 of the divided piece 12A positioned between the two bolt holes 25 of the shank 15, a bolt 26 is inserted through the three bolt holes 23, 25, and a nut 27 is screwed on the bolt, whereby the divided piece 12A is attached to the shank 15 pivotally movably horizontally. The shank 15 has a bulging spherical lower end face.

The holder 13 comprises a horizontal tubular hollow casing 31 having a rectangular cross section, vertical tubular guides 32 of circular cross section extending through the top wall of the casing 31, arranged at a spacing longitudinally of the casing 31, equal in number to the number of shanks 15 and having the respective shanks 15 fitted therein, and a pair of dust covers 33 made of a rubber sheet, covering opposite sides of the assembly of the blade member 12 and the casing 31 and extending from the blade member upper portion to an intermediate portion of the height of the casing 31.

The dust covers 33 are attached to the blade member 12 by inserting rivets 34 through the covers 33 and the respective rivet holes 22 of the blade member 12 and crimping the rivets. The rivets 34 are crimped with the dust covers 33 tensioned longitudinally thereof, whereby the divided pieces 12A are so tensioned by the dust covers 33 that no clearance will be formed between the scraper blades 11 of the adjacent divided pieces 12A.

The elastic body 14 comprises a rubber tube 41, a protective cover 42 made of rubber and covering the tube 41 and end plates 43 closing opposite end openings of the tube 41. Each end of the protective cover 42 is fastened to the end plate 43 with a fastener 44.

A hose 45 for supplying pressurized air has one end extending through an end wall of the casing 31 and connected to one of the end plates 43. The hose 45 is provided with a fluid pressure control valve 47 having a control gauge 46. The other end of the hose 45 is connected to an unillustrated compressor.

When compressed air is supplied to the elastic body 14 by the compressor, the elastic body 14 is inflated, causing the shank 15 to project from the casing 31 and thereby pressing the blade member 12 against the belt B. The pressure at this time is adjusted by controlling the pressure of air with reference to the scale on the gauge 46 of the valve 47. A satisfactory result can be achieved with an air pressure of up to 2 kg/cm$^2$ in a steady state, so that the cleaner is operable without hazards, while the power for operating the compressor is almost zero since the possible leak only need to be compensated for by the compressor.

When the belt B is driven with the blade member 12 pressed against the belt B, the remaining material adhering to the belt B is scraped off by the blade member 12 and falls along the outer surfaces of the covers 33. Although the plurality of divided pieces 12A are joined together by the dust covers 33, the adjacent pieces are flexible relative to each other, while the whole assembly is deformable in accordance with the number of divided pieces 12A in conformity with the wear or deformation of the belt B.

Should the remaining material ingress inside the dust covers 33 and enter the clearance between the shank 15 and the guide 32, the material is removable by inflating and contracting the elastic body 14 and thereby moving the shanks 15 upward and downward.

The scraper blades 11 are replaced periodically owing to wear by preparing an assembly of blade member 12, shanks 15 and dust covers 33 in advance, and replacing the corresponding assembly by the prepared assembly by inserting the shanks 15 of the latter into the guides 32.

EMBODIMENT 2

Figure 4:
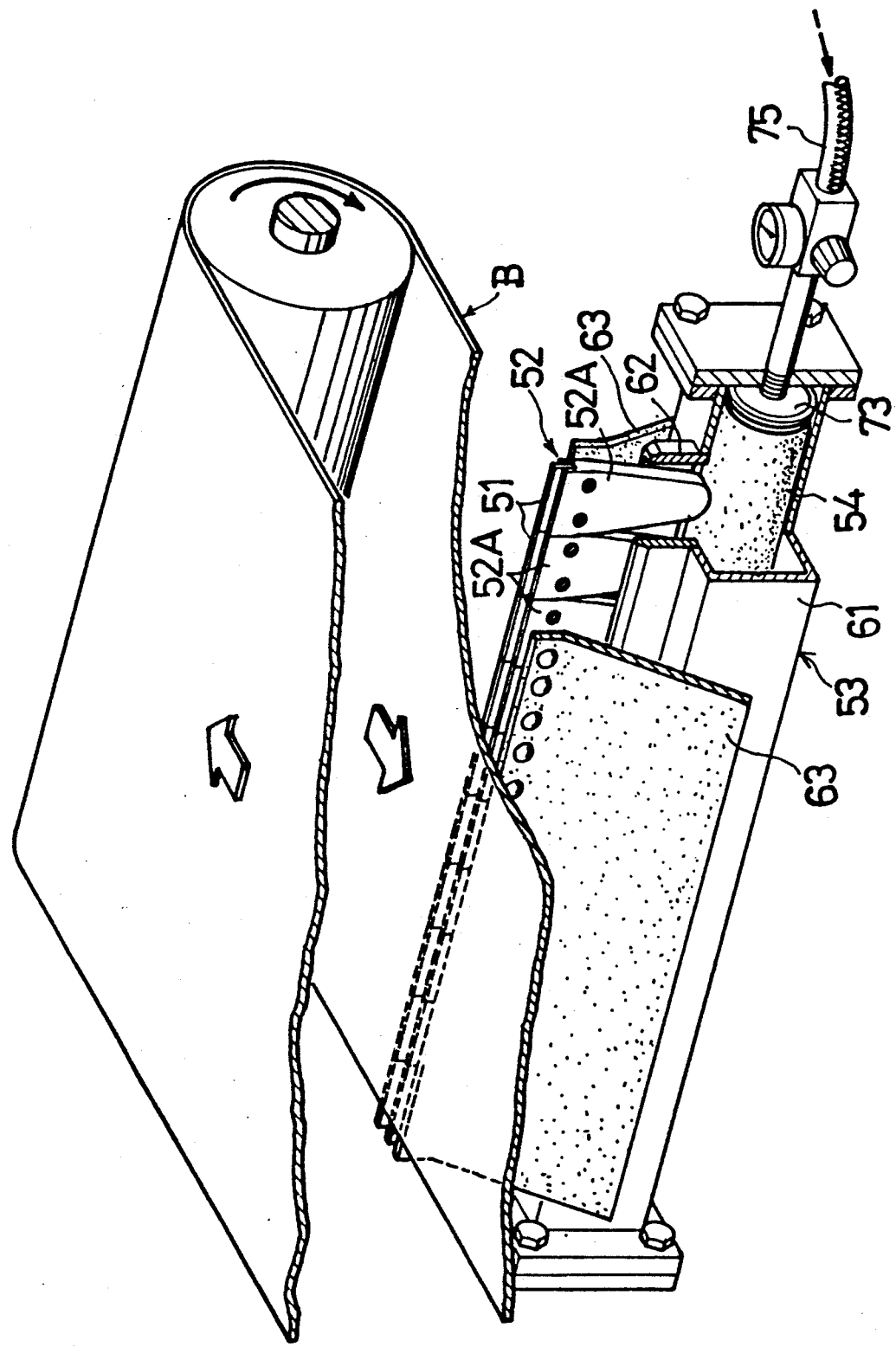
FIGS. 4 to 6 show an embodiment 2 of the invention.
Figure 5:
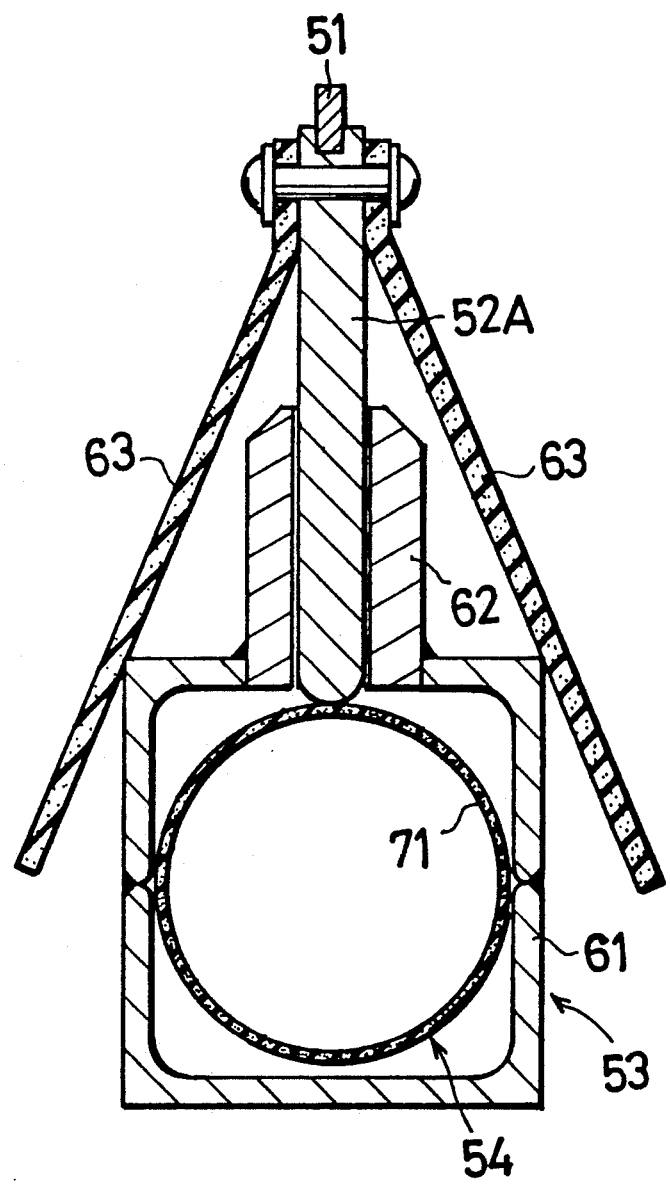
Figure 6:
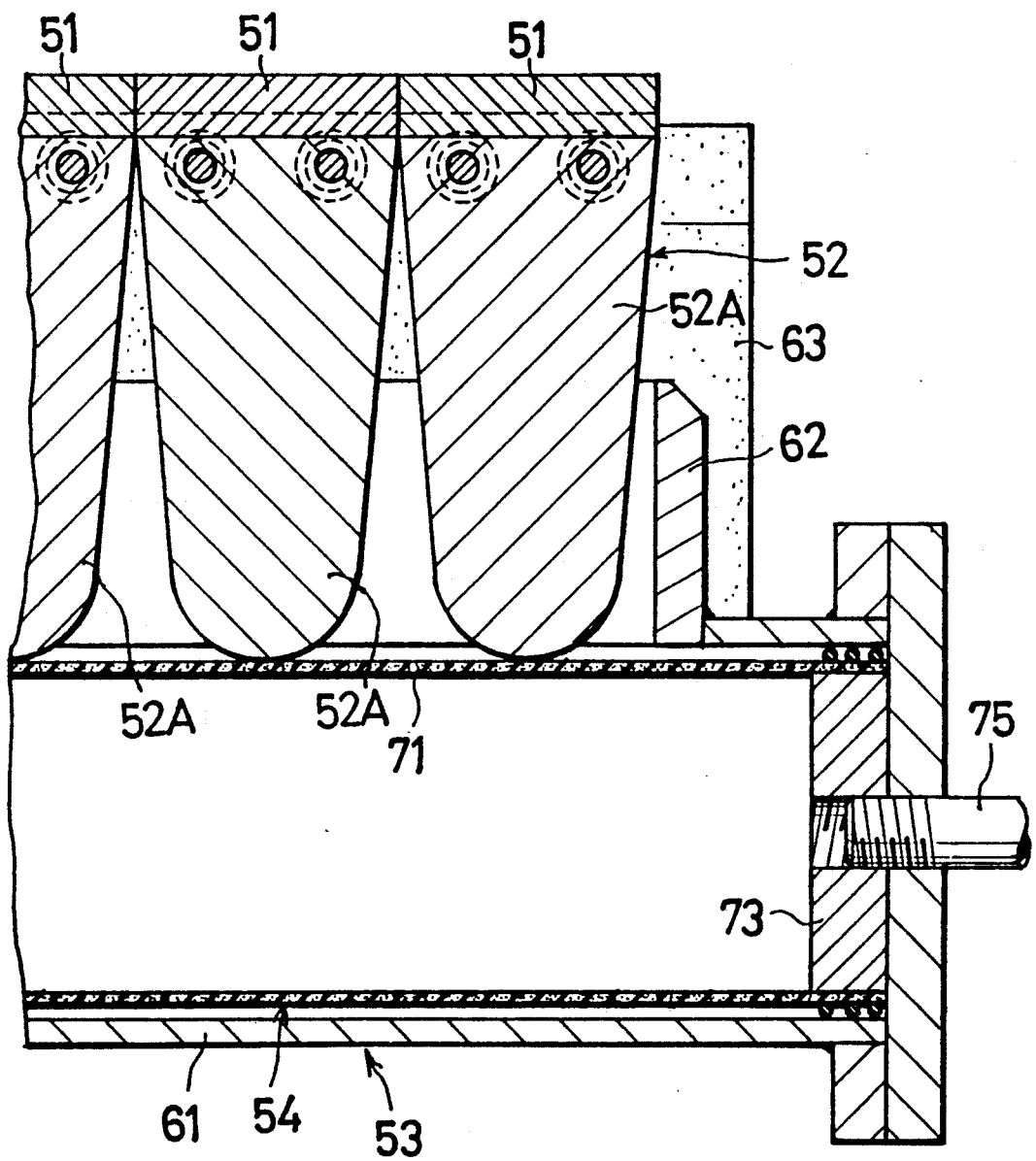

FIGS. 4 to 6 show another belt cleaner as an embodiment 2, which, like the embodiment 1, comprises a blade member 52 having scraper blades 51 at its upper end, a holder 53 holding the blade member 52 upwardly and downwardly movably, a hollow elastic body 54 supporting the base end of the blade member 52 held by the holder 53, and supply means for supplying a pressure fluid to the interior of the elastic body 54 so as to inflate or contract the elastic body 14.

The blade member 52, like that of the embodiment 1, comprises a plurality of divided pieces 52A each generally in the form of an inverted trapezoidal vertical plate, but differs from that of the embodiment 1 in that each of the divided pieces 52A has a semicircular lower end which bears directly on the holder 53 with no shank provided therebetween.

The holder 53 comprises a horizontal tubular hollow casing 61 having a rectangular cross section, a vertical flat tubular guide 62 inserted through the top wall of the casing 61, extending longitudinally of the casing 61 and having all the divided pieces 52A fitted therein, and a pair of dust covers 63 made of a rubber sheet, covering opposite sides of the assembly of the blade member 52 and the casing 61 and extending from the blade member upper portion to an intermediate portion of the height of the casing 61.

The elastic body 54 does not have a component corresponding to the protective cover 42 of the embodiment 1 but comprises a rubber tube 71 and end plates 73 closing opposite end openings of the tube 71. A hose 75 is connected to one of the end plates 73 as in the embodiment 1.

EMBODIMENT 3

Figure 7:
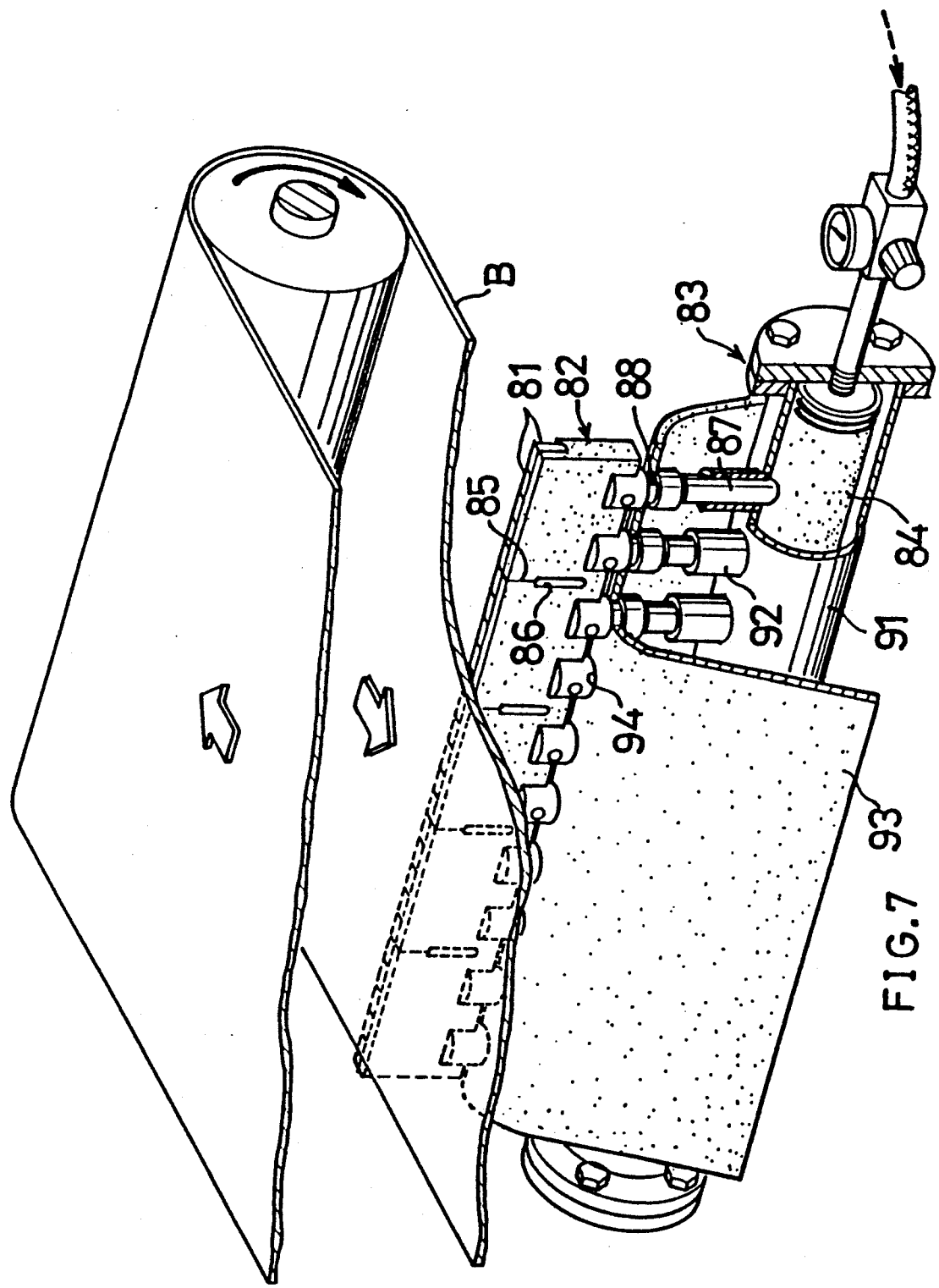
FIGS. 7 to 9 show an embodiment 3 of the invention.
Figure 8:
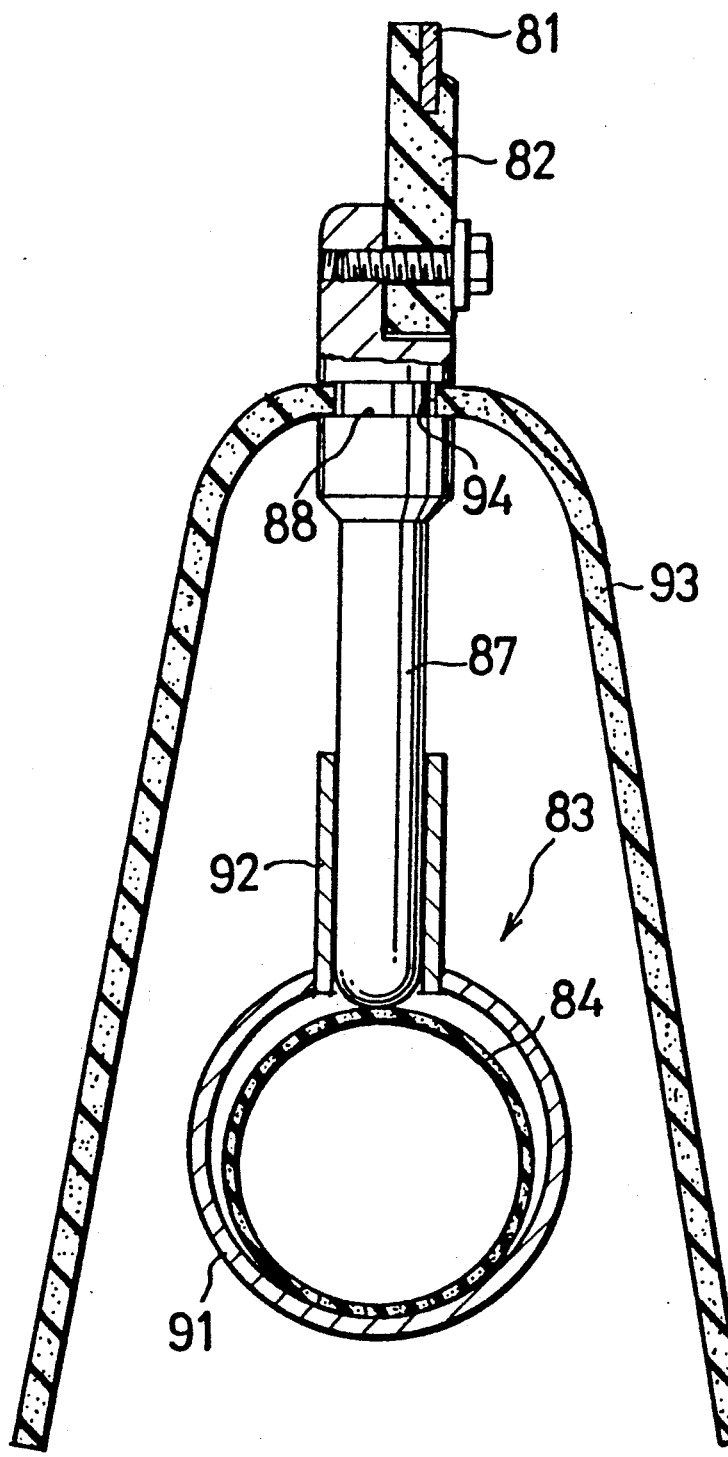
Figure 9:
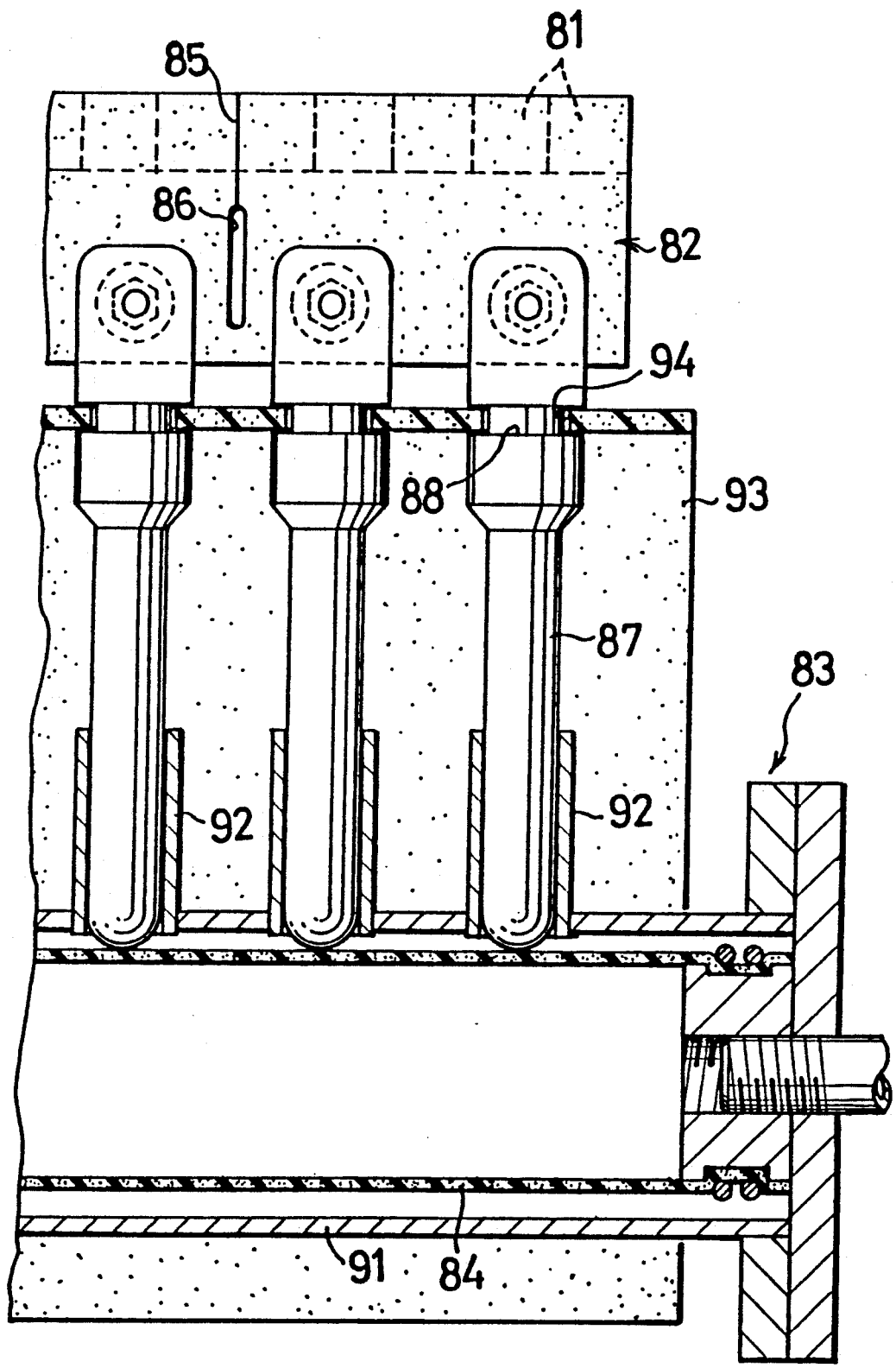

FIGS. 7 to 9 show another belt cleaner as an embodiment 3, which comprises a blade member 82 having a plurality of scraper blades 81 at its upper end, a holder 83 holding the blade member 82 upwardly and downwardly movably, a hollow elastic body 84 supporting the base end of the blade member 82 held by the holder 83, and supply means for supplying a pressure fluid to the interior of the elastic body 84 so as to inflate or contract the elastic body 84.

Although the scraper blade 81 comprises a ceramic tile, a chip of cemented carbide may alternatively be used.

The blade member 82 comprises rubber sheet disposed approximately vertically and having a slightly large thickness. The plurality of scraper blades 81 are fixed in place by vulcanization bonding of rubber as arranged in a row. All the scraper blades 81 are divided into a plurality of groups by vertical slits 85 extending from the upper edge of the blade member 82 to a position close to the lower edge thereof for rendering the blade member flexible. The lower half of each slit 85 has an increased width as indicated at 86. The lower edge portion of the blade member 82 is supported by a plurality of shanks 87, two shanks 87 being provided for each of the blade member portions divided by the slits 85. Although the shank 87 is similar to that of the embodiment 1, it is formed with an annular groove 88 close to its upper end.

The holder 83 comprises a horizontal tubular hollow casing 91 having a circular cross section, vertical tubular guides 92 of circular cross section extending through the top wall of the casing 91, arranged at a spacing longitudinally of the casing 91, equal in number to the number of shanks 87 and having the respective shanks 87 fitted therein, and a dust cover 93 made of a rubber sheet, inverted U-shaped in cross section and extending approximately from the upper ends of the shanks 87 to opposite sides of the casing 91. The dust cover 93 is formed in its top with a plurality of apertures 94 having the annular grooved portions 94 of the respective shanks 87 fitted therein.

The elastic body 84 and the supply means are the same as those of the embodiment 2.

EMBODIMENT 4

Figure 10:
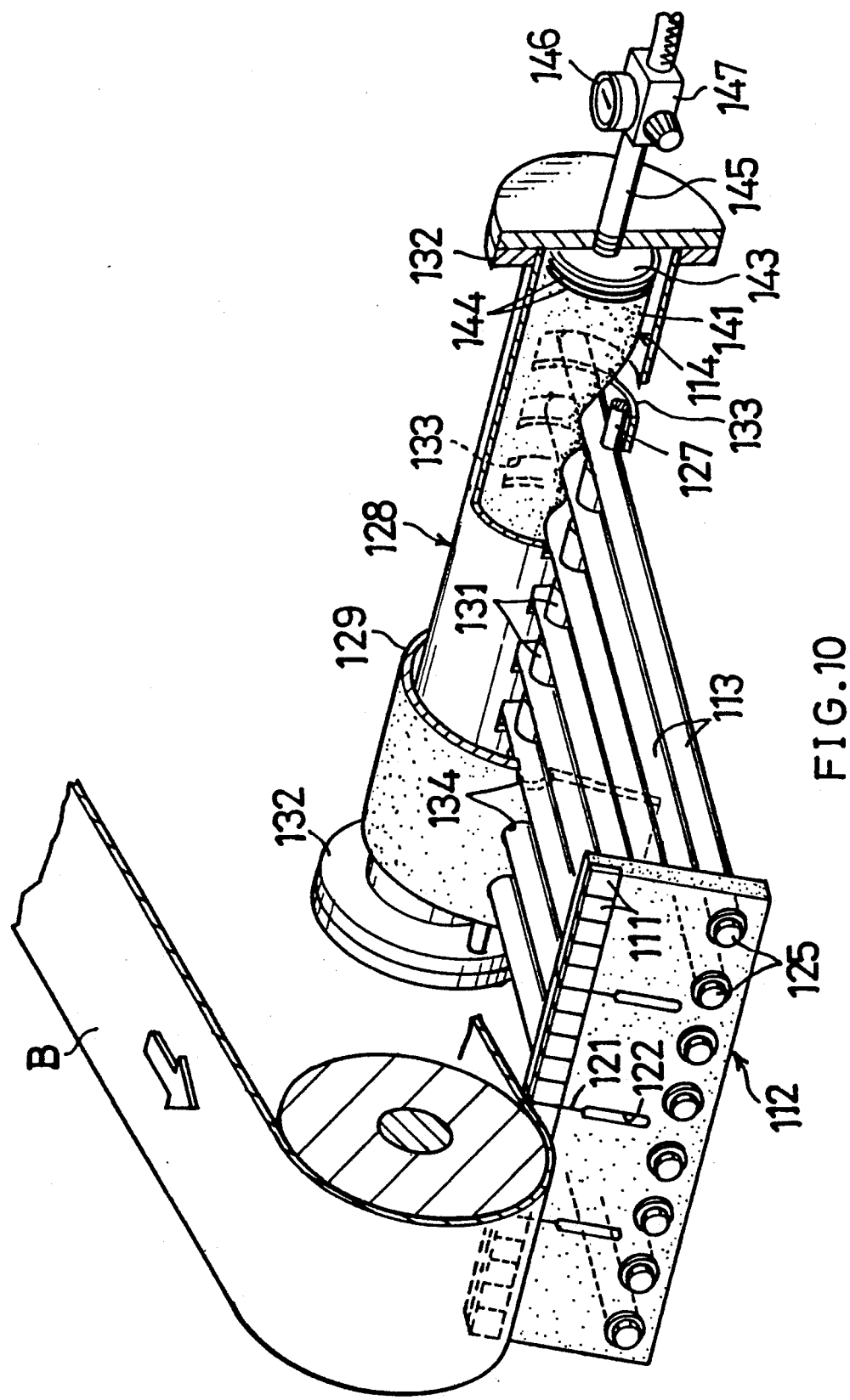
FIGS. 10 to 12 show an embodiment 4 of the invention.
Figure 11:
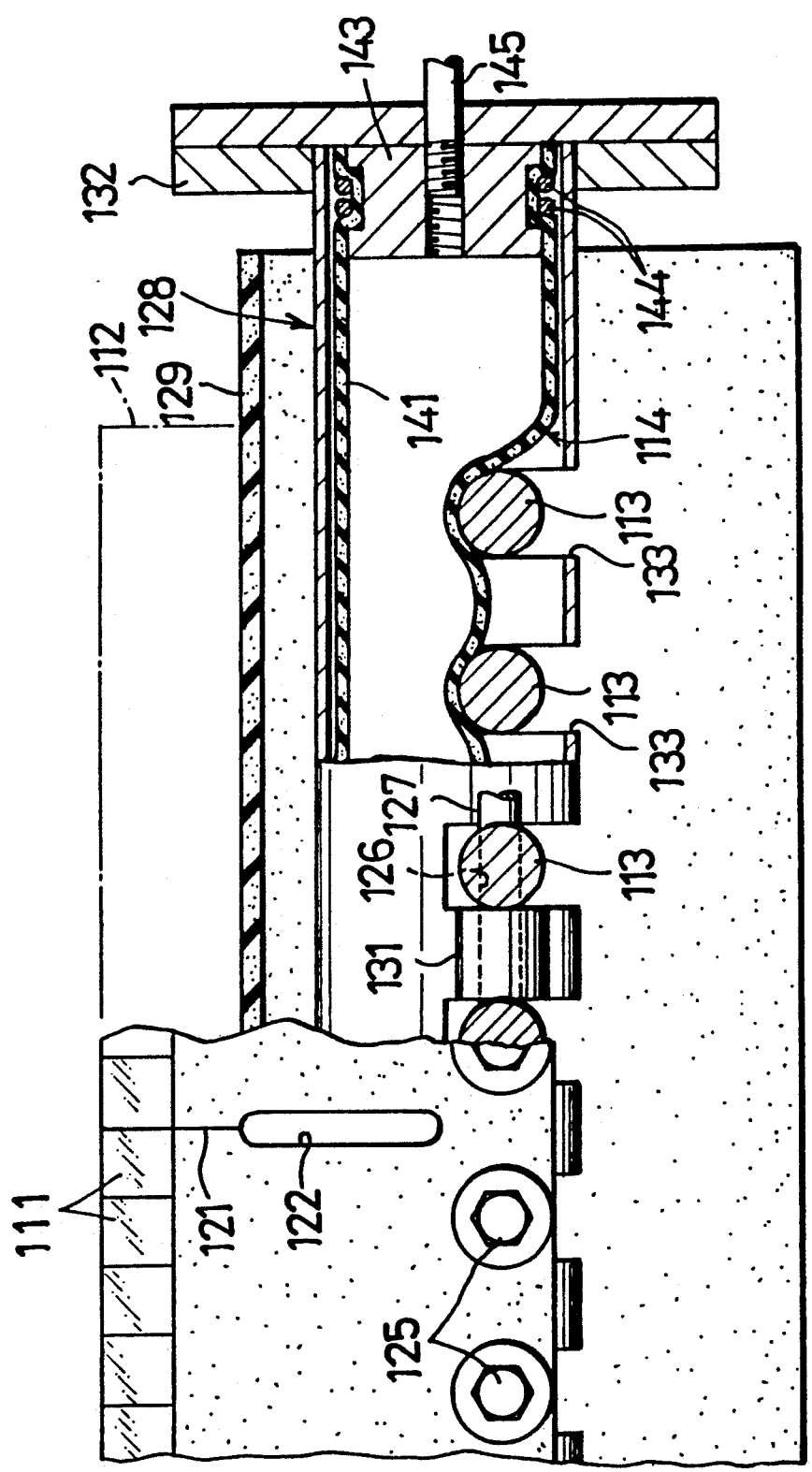
Figure 12:
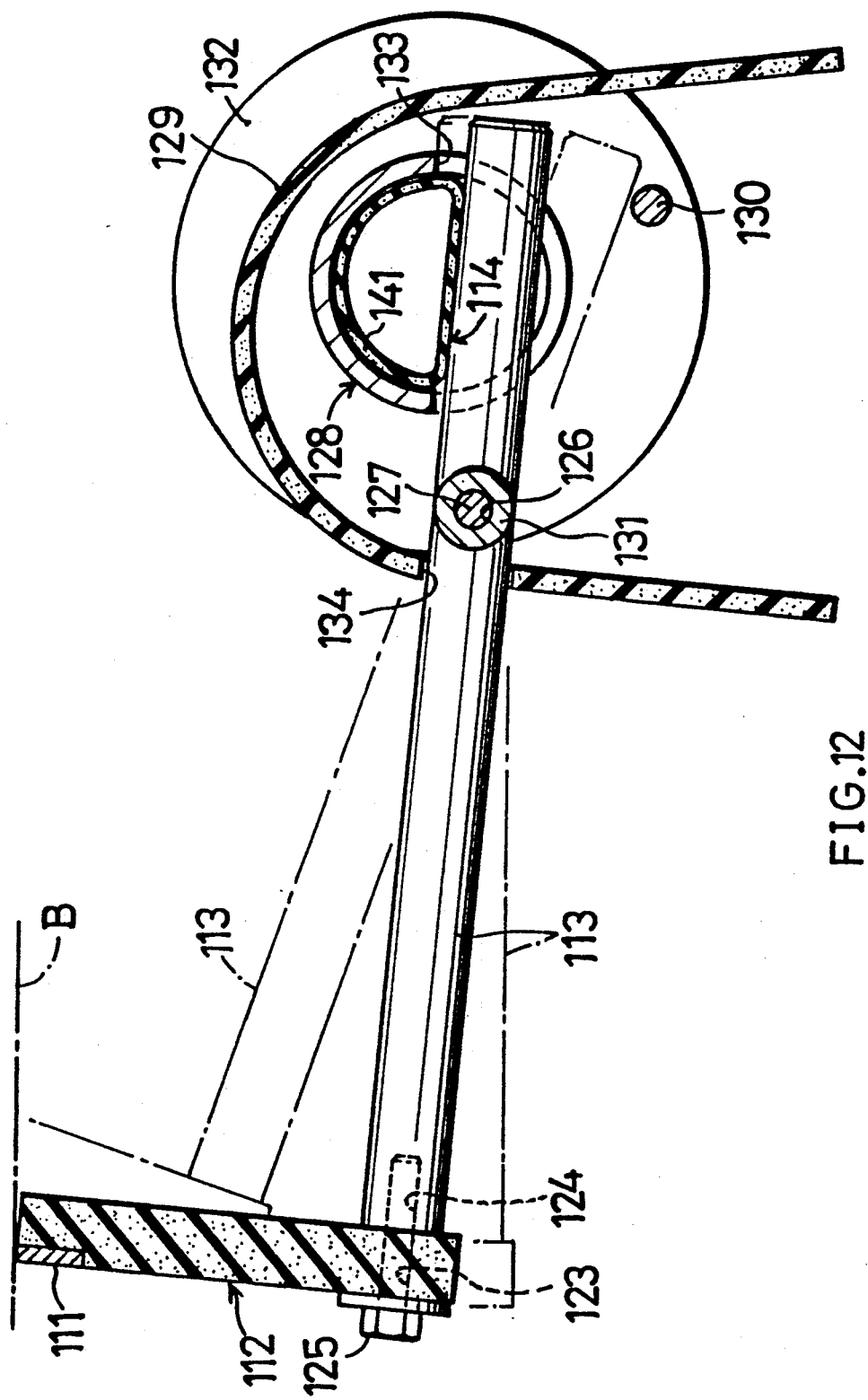
Figure 13:
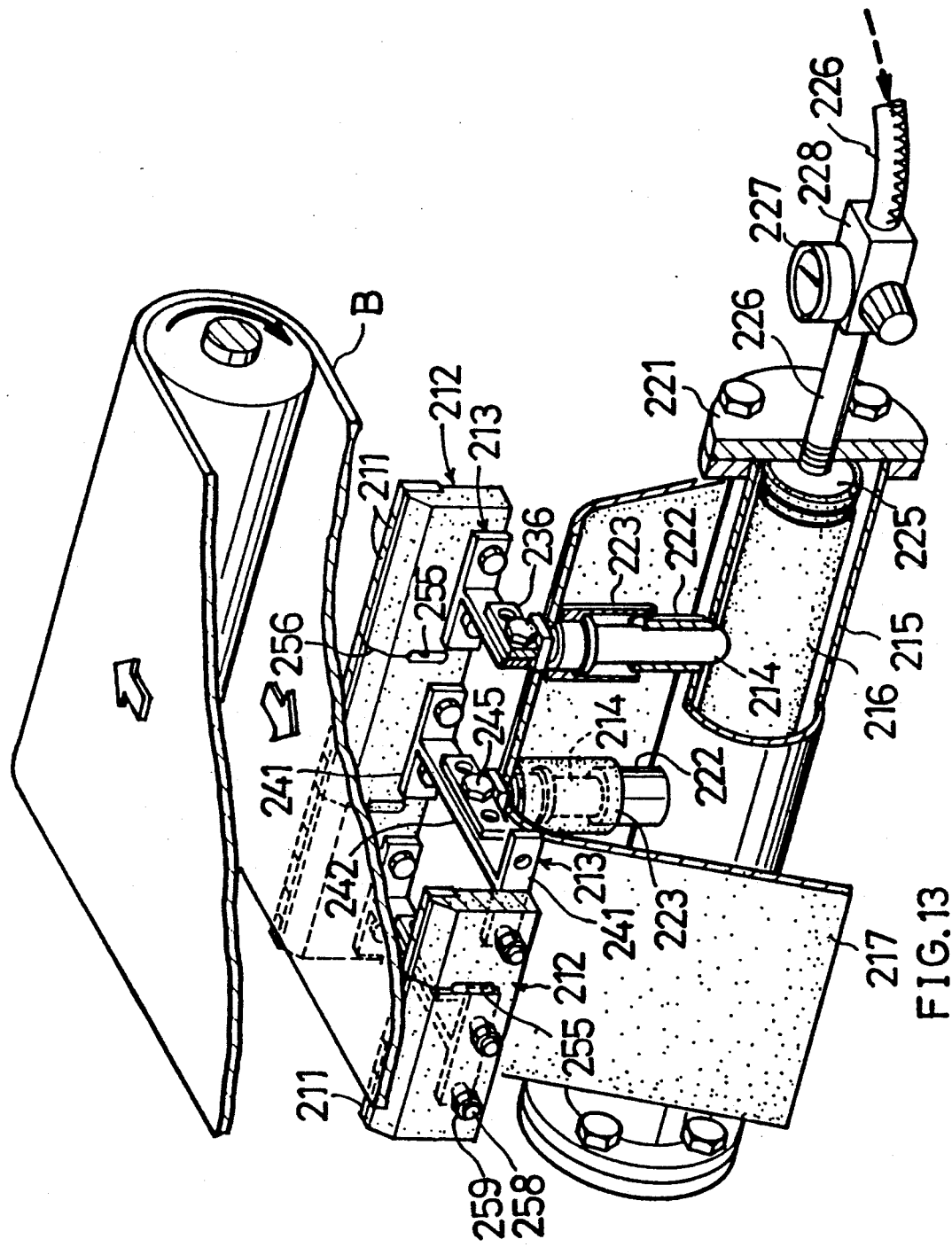
FIGS. 13 to 18 show an embodiment 5 of the invention.
Figure 14:
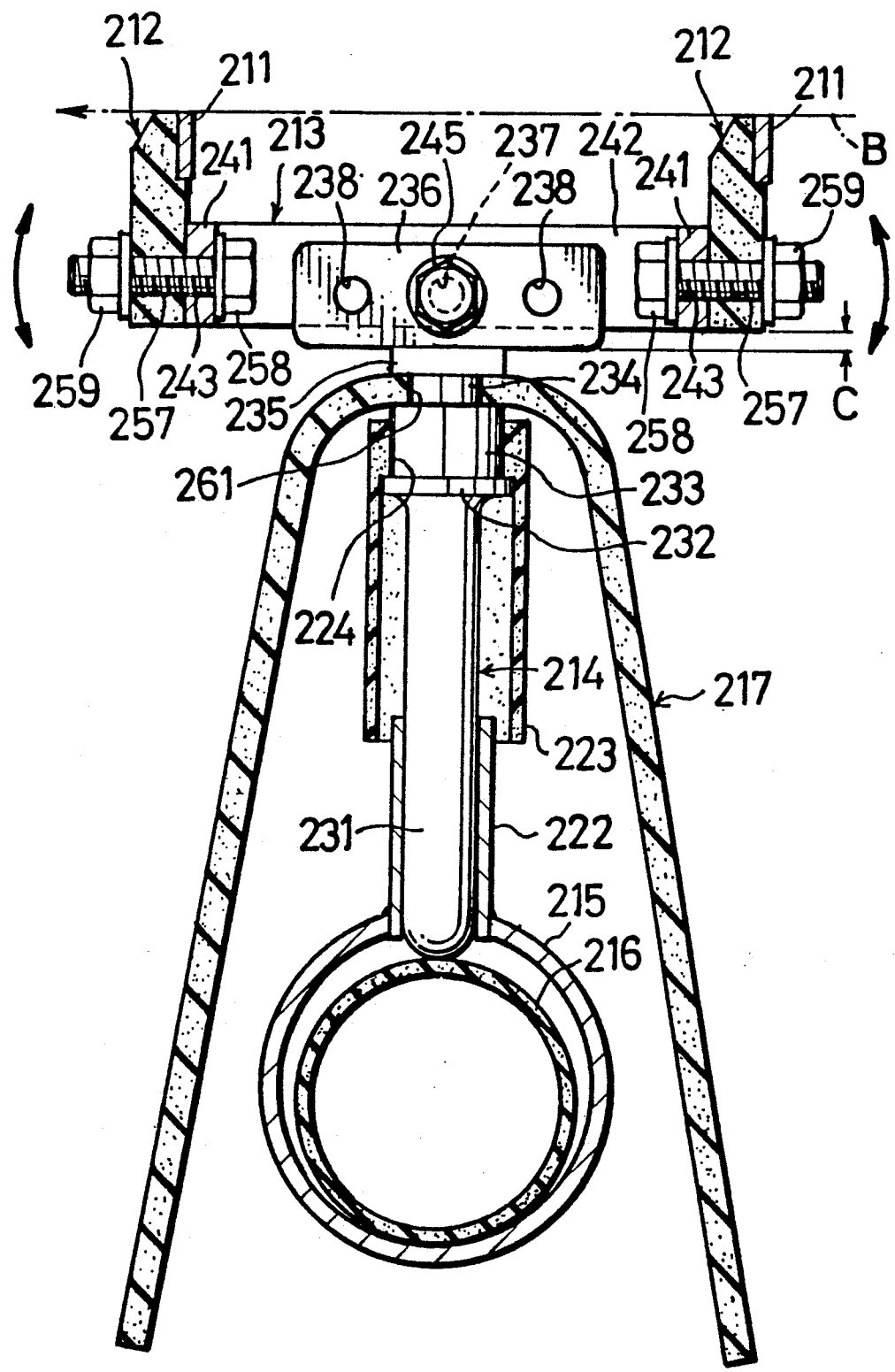

FIGS. 10 to 12 show another belt cleaner as an embodiment 4, which comprises a rubber blade member 112 having a plurality of ceramic tile scraper blades 111 at its upper end and disposed at the starting end of a return path of travel of a belt B, a plurality of levers 113 arranged in parallel and each having the blade member 112 attached to one end thereof, means for supporting the levers 113 upwardly and downwardly pivotally movably with the scraper blades 111 directed upward, a hollow elastic body 114 for urging the other ends of the levers 113 downward, and supply means for supplying a pressure fluid to the interior of the elastic body 114 so as to inflate or contract the elastic body 114.

As in the embodiment 3, the blade member 112 is formed with vertical slits 121 for rendering the member flexible, portions 122 of increased width and bolt holes 123 equal in number to the number of levers 113, these portions 121 to 123 being spaced as specified.

The lever 113 is in the form of a round rod. The lever 113 is formed in its one end with an axial threaded bore 124 having a bolt 125 screwed therein, whereby the blade member 112 is attached to the lever 113. The lever 113 has a lateral hole 126 formed at a portion closer to the other end thereof than the midportion of its length.

The support means comprises a horizontal support rod 127 extending straight through the lateral holes 126 of the levers 113, a horizontal tubular hollow casing 128 for supporting the support rod 127 and guiding the pivotal movement of the levers 113, a rubber dust cover 129 inverted U-shaped in cross section and provided over the support rod 127 and the casing 128, and a stopper 130 for defining an upper limit position for the blade member 112. A plurality of spacers 131 each in the form of a sleeve are fitted around the support rod 127 and interposed between the levers 113. A circular flange 132 is attached to each end of the casing 128. The support rod 127 is connected between the flanges 132. The casing 128 is formed in its lower half portion with a plurality of guide grooves 133 arranged at a predetermined spacing and having the respective levers 113 fitted therein. The dust cover 129 has a plurality of apertures 134 formed at a predetermined spacing and having the respective levers 113 inserted therethrough. The stopper 130 is connected between the flanges 132 to extend in parallel to the support rod 127 and is so positioned as to permit the other ends of the levers 113 to come into contact therewith.

As in the foregoing embodiments, the elastic body 114 comprises a rubber tube 141, end plates 143 closing opposite end openings of the tube 141, and a fastener 144 fixing each end of the tube 141 to the end plate 143.

A hose 145 for supplying pressurized air has one end extending through an end wall of the casing 128 and connected to one of the end plates 143. The hose 145 is provided with a fluid pressure control valve 147 having a control gauge 146.

When pressurized air is supplied to the elastic body 114, the body 114 is inflated, pushing down the other ends of the levers 113 and thereby pressing the blade member 112 against the belt B.

When the scraper blades 111 are to be replaced periodically owing to wear, the bolts 125 are removed to remove the blade member 112 from the levers 113, and a new blade member is alternatively attached to the levers 113.

EMBODIMENT 5

With reference to an embodiment 5 shown in FIGS. 13 to 18, the term "front" refers to the direction (shown by an arrow) in which a forwardly driven conveyor belt B advances, and the term "rear" to a direction opposite to this direction. The term "transverse" refers to a direction perpendicular to the direction of advance of the belt.

The belt cleaner of the embodiment 5 comprises front and rear two blade members 212 arranged as opposed to each other under the starting end of a return path of travel of the belt B, a plurality of spacers 213 provided between the two blade members 212, shanks 214 equal in number to the number of spacers 213 and each having the spacer 213 pivotably connected thereto, a horizontal hollow casing 215 extending transversely of the belt B and holding the shanks 214 upwardly and downwardly movably, a scraper pressure control elastic tube 216 closed at its opposite ends and housed in the casing 215, and a rubber dust cover 217 inverted U-shaped in cross section and positioned under the blade members 212 for covering the shanks 214 and the casing 215.

As in the embodiments 3 and 4, each of the blade members 212 is made of rubber, has a large thickness and is in the form of a laterally elongated rectangle. A plurality of scraper blades 211 of ceramic tiles are provided at the upper end of the blade member 212 on a scraping side thereof. Slits 256 each having a portion 255 of increased width are formed in the blade member 212 as arranged at a spacing longitudinally thereof. Pairs of spacer attaching holes 257 are formed in the lower edge portion of the blade member 212.

Figure 15:
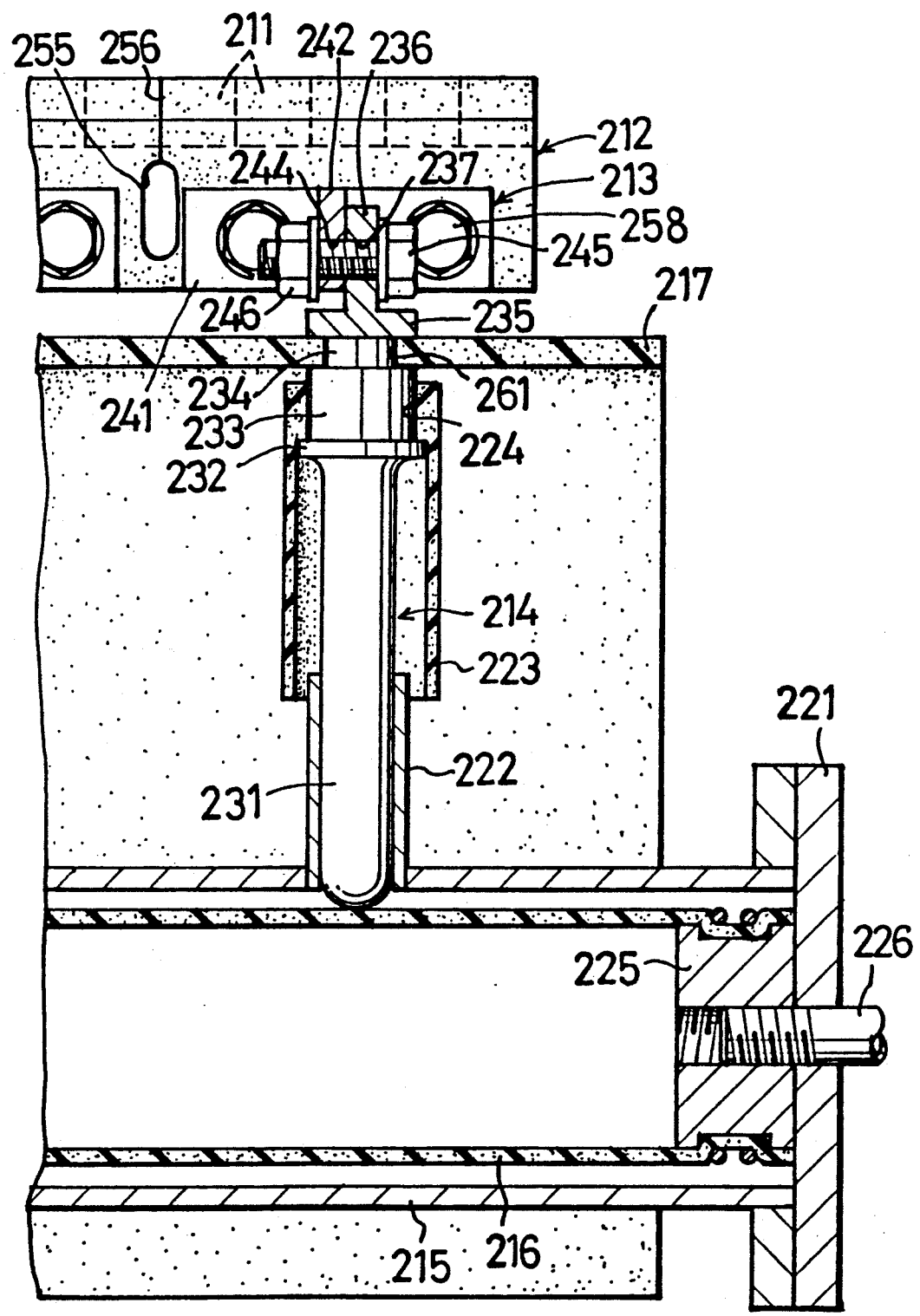
Figure 16:
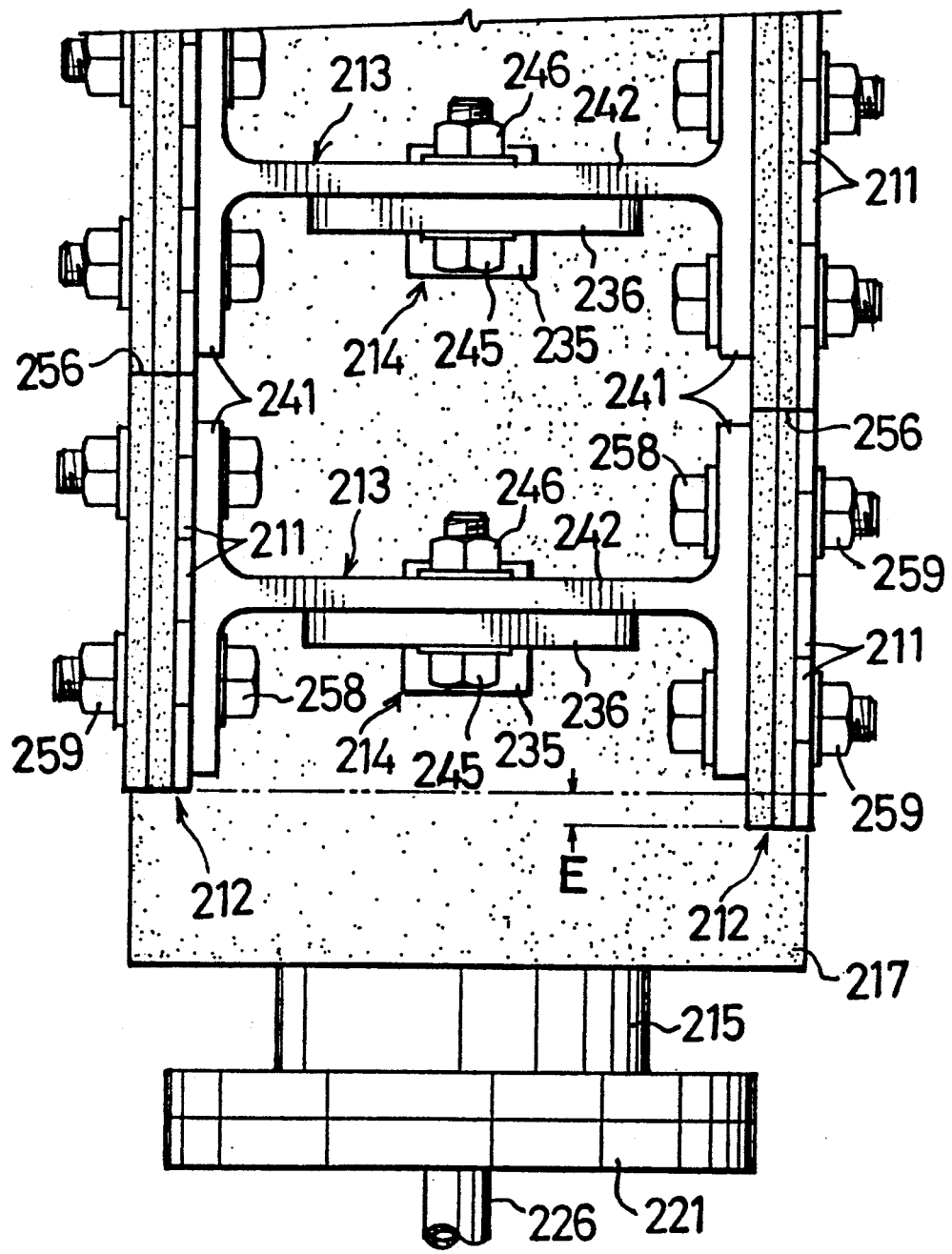

As best seen in FIG. 16, the spacers 213 are H-shaped when seen from above and each comprise a pair of blade carrying portions 241 opposed to each other at a predetermined spacing, and a connector 242 interconnecting these blade carrying portions 241 at the midportion of their length. Pairs of blade attaching holes 243 are formed in the respective blade carrying portions 241 with the same pitch. A shank attaching hole 244 is formed in the connector 242 at the midportion of its height (FIG. 15).

The pitch of the blade attaching holes 243 of each spacer 213 is equal to the pitch of each pair of spacer attaching holes 257 of each blade member 212. The two blade members 212 are attached to the spacers 213 by inserting bolts 258 through the two blade attaching holes 243 of each blade carrying portion 241 of each spacer 213 and through the corresponding spacer attaching holes 257 of each blade member 212 and screwing nuts 259 on the respective bolts.

With the front and rear blade members 212 thus attached to the spacers 213, the scraping faces of the two blade members 212 face to the rear. Further with reference to FIG. 16, the ceramic tile joints of one of the front and rear blade members 212 are out of register with the corresponding joints of the other blade member by exactly one-half of the width of the ceramic tile, i.e., by a distance E, with respect to the transverse direction.

Each of the shanks 214 has, as arranged from below upward, a small-diameter rod portion 231, flange 232, large-diameter rod portion 233, annular groove 234, spacer stopper 235 and spacer attaching portion 235. The small-diameter rod portion 231 is slidably fitted in a small-diameter vertical guide sleeve 222. A tubular cover 223 having a portion 224 engaging with the flange 232 from above is fitted around the large-diameter rod portion 233 and a portion of the shank 214 extending downward therefrom. The spacer stopper 235 has a contour which is square in cross section. The spacer attaching portion 236 is in the form of a vertical laterally elongated rectangular plate. A spacer attaching hole 237 is formed in the spacer attaching portion 236 at the midportion of its length. Two auxiliary holes 238 of the same pitch as the spacer attaching holes 257 in a pair are formed in the portion 236 at opposite sides of the hole 237. The spacer 213 is attached to the shank 214 by inserting a bolt 245 through the spacer attaching hole 237 and the shank attaching hole 244 and screwing a nut 246 on the bolt 245.

With the spacer 213 attached to the shank 214, there is a clearance C (see FIG. 14) between the spacer stopper 235 of the shank 214 and the connector 242 of the spacer 213, permitting the spacer 213 to pivotally move by an amount corresponding to the clearance C.

The casing 215 is a tube having a circular cross section and has end plates 221 closing opposite end openings. Where the shanks extend through the top wall of the casing 215, the wall has vertical guide sleeves 222.

The tube 216 has end plates 225 closing its opposite end openings. A hose 226 for supplying pressurized air has one end extending through one of the end plates 221 of the casing 215 and connected to the corresponding end plate 225. The hose 226 is provided with a fluid pressure control valve 228 having a control gauge 227.

The dust cover 216 is formed in its top with a plurality of shank inserting apertures 261. The apertured portions 261 of the cover 216 are fitted in the annular grooves 234 of the respective shanks 214.

When pressurized air is supplied to the tube 216, the tube 216 is inflated, pushing up the shanks 214 and causing the spacers 213 to press the front and rear blade members 212 similarly against the belt B.

When the conveyor is driven forward with the blade members 212 pressed against the belt B, the material remaining on and adhering to the belt B is scraped off chiefly by the rear blade member 212. A portion of the material, if remaining unremoved, is scraped off by the front blade member 212. When containing a large amount of water, the remaining material is liable to remain unremoved partly at the ceramic tile joint, whereas the ceramic tile joints of one of the front and rear blade members 212 are out of register with those of the other blade member transversely of the belt. Accordingly, a portion of the remaining material, even if passing through the joint of the front blade member 212, is scraped off by the rear blade member 212.

For example when the belt B greatly undulates, the spacers 213 pivotally move to follow the undulation, moving the front and rear blade members 212 upward and downward alternately.

Figure 17:
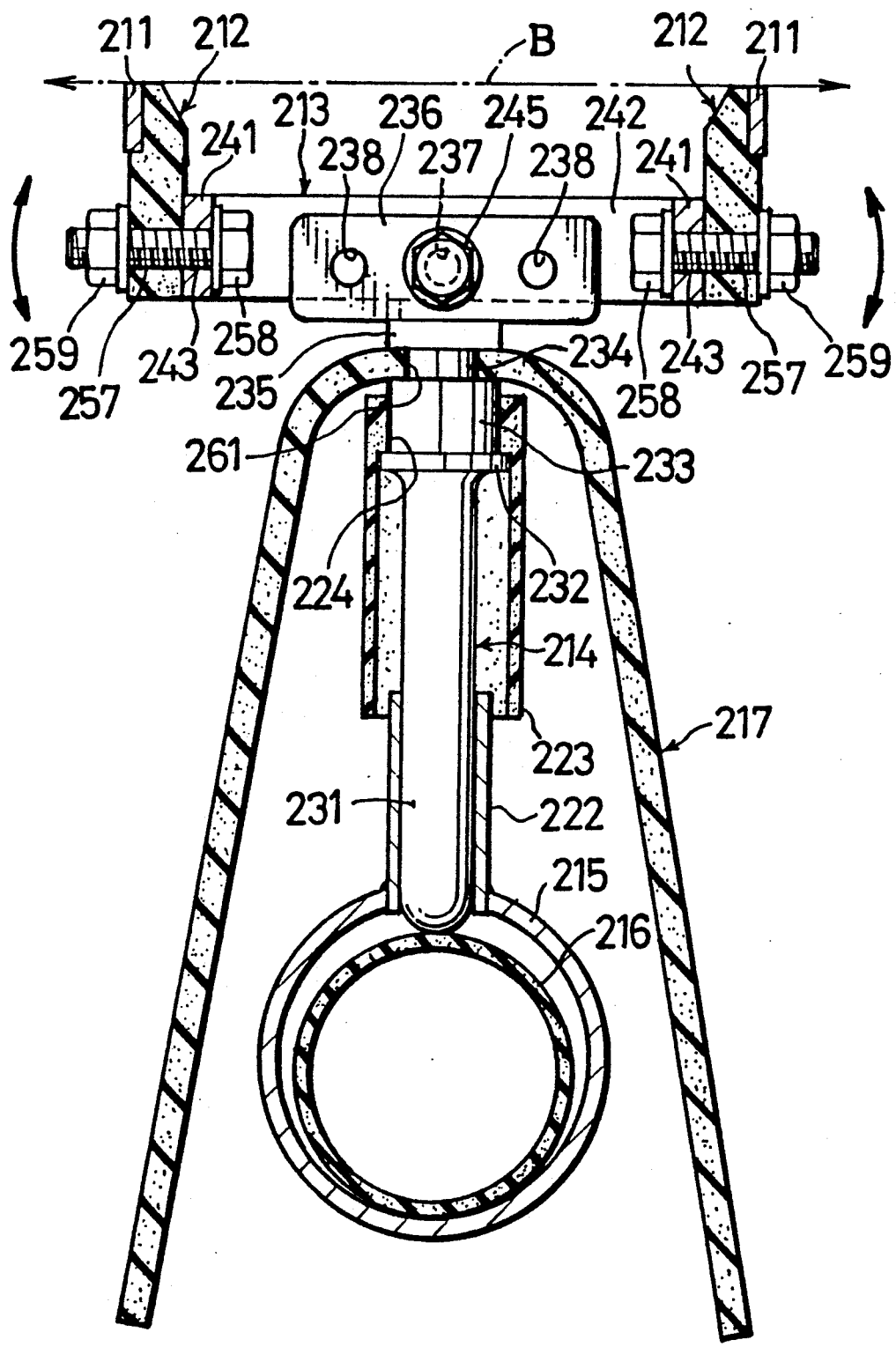

FIG. 17 shows other exemplary mode of using the blade members. In the illustrated arrangement, the scraping face of the front blade member 212 faces to the front, and the scraping face of the rear blade member 212 faces to the rear. Thus, the scraping faces of the front and rear blade members 212 are oriented in directions opposite to each other. When the belt B is driven forward as in the above embodiment, the rear blade member 212 acts to scrape off the remaining material, whereas if the belt B is reversely driven, the front blade member 212 performs a scraping function.

Figure 18:
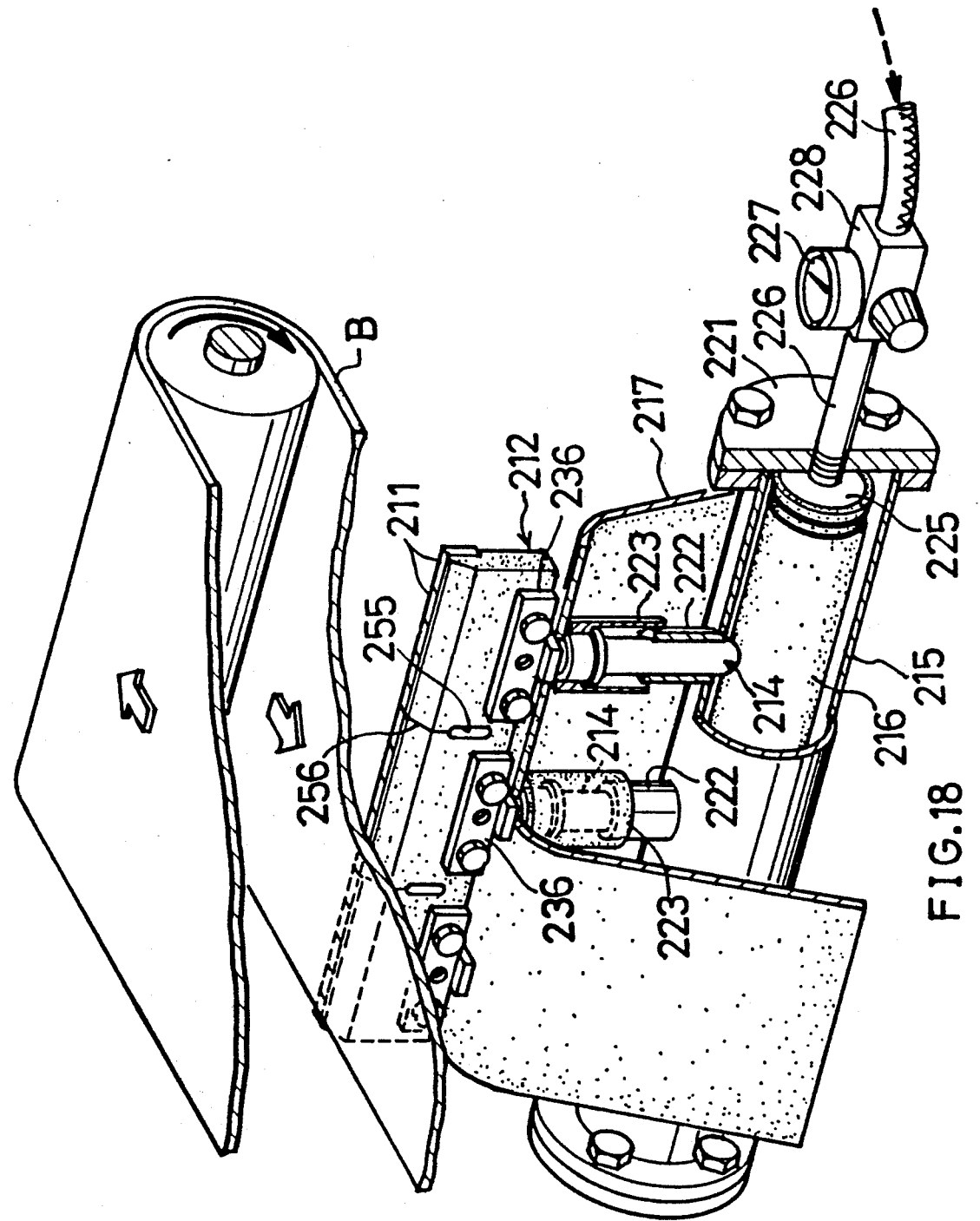

FIG. 18 shows another exemplary mode of using the blade members. In this embodiment, one blade member 212 is attached to shanks 214 in the absence of any spacer 213. In this case, the two auxiliary holes 238 of the shank 214 are used.

What is claimed is:

1. A belt cleaner for a belt conveyor comprising:
a vertical blade member having at its upper end a scraper blade to be pressed against the lower surface of a belt at a starting end of a return path of travel of the belt, wherein the blade member comprises a plurality of divided pieces arranged in contact with one another;
means for holding the blade member upwardly and downwardly movably;
means for applying pressure to the blade member held by the holding means, the pressure applying means having a hollow elastic body; and
means for supplying a pressure fluid to the interior of the elastic body under variable pressure;
wherein each of the divided pieces of the blade member has a lower end connected to the upper end of at least one vertical rodlike shank, and the holding means has a horizontal tubular casing disposed under the blade member, and upwardly projecting vertical tubular guides of circular cross section formed on the top of the casing in communication with the interior of the casing and equal in number to the number of the shanks, the guides having the respective shanks fitted therein, the elastic body comprising a horizontal rubber tube closed at opposite ends and housed in the casing for supporting the lower ends of the shanks.

2. A belt cleaner as defined in claim 1 wherein the divided pieces are joined together with a rubber sheet.

3. A belt cleaner for a belt conveyor comprising:
a vertical blade member having at its upper end a scraper blade to be pressed against the lower surface of a belt at a starting end of a return path of travel of the belt, wherein the scraper blade comprises a plurality of tiles arranged along the upper end of the blade member;
means for holding the blade member upwardly and downwardly movably;
means for applying pressure to the blade member held by the holding means, the pressure applying means having a hollow elastic body; and
means for supplying a pressure fluid to the interior of the elastic body under variable pressure;
wherein the blade member is divided by at least on slit extending from the upper edge of the blade member to a position close to the lower edge of the blade member between the tiles into a plurality of portions each having connected thereto the upper end of at least one vertical rodlike shank, and the holding means has a horizontal tubular casing disposed immediately below the blade member, and upwardly projecting vertical tubular guides formed on the top of the casing in communication with the interior of the casing and equal in number to the number of the shanks, the guides having the respective shanks fitted therein, the elastic body comprising a horizontal tube closed at opposite ends and housed in the casing for supporting the lower ends of the shanks.

4. A belt cleaner as defined in claim 3 wherein the blade member is divided by the slit at least one into a plurality of portions each having connected thereto one end of at least one lever, and the holding means has a horizontal tubular casing disposed horizontally away from the blade member and formed in its bottom with guide grooves, the guide grooves being equal in in number to the number of levers and having the other ends of the levers fitted therein, the elastic body comprising a horizontal rubber tube closed at opposite ends and housed in the casing so as to hold the other ends of the levers.

5. A belt cleaner as defined in claim 1 wherein the scraper blade comprises a plurality of ceramic tiles arranged along the upper end of the blade member, and the blade member is made of an elastic material.

6. A belt cleaner as defined in claim 5, wherein said tubular guides have a circular cross section, and wherein said horizontal tube is made of rubber.

7. A belt cleaner as defined in claim 5 wherein the elastic material is rubber.

8. A belt cleaner for a belt conveyor comprising:
two vertical blade members each having at least upper end a scraper blade to be pressed against the lower surface of the belt at the starting end of a return path of travel of the belt, wherein the scraper blade comprises a plurality of tiles arranged along the upper end of each blade member on one surface thereof;
means for holding the blade members upwardly and downwardly movably as opposed to and spaced apart by a predetermined distance from each other in the direction of travel of the belt;
means for applying pressure to the blade members held by the holding means, the pressure applying means having a hollow elastic body; and
means for supplying a pressure fluid to the interior of the elastic body under variable pressure;
wherein each of the blade members is divided by at least one slit extending from the upper edge of the blade member to a position close to the lower edge of the blade member between the tiles into a plurality of portions, each pair of the opposed blade member portions being interconnected by a spacer having connected thereto the upper end of at least one vertical rodlike shank at an intermediate position between the two blade members so that the spaces is pivotally movable upward and downward, and the holding means has a horizontal tubular casing disposed between the blade members therebelow, and upwardly projecting vertical tubular guides formed on the top of the casing in communication with the interior of the casing and equal in number to the number of the shanks, the guides having the respective shanks fitted therein, the elastic body comprising a horizontal tube closed at opposite ends and housed in the casing for supporting the lower ends of the shanks.

9. A belt cleaner as defined in claim 8 wherein the scraper blade comprises a plurality of ceramic tiles arranged along the upper end of the blade member on one surface thereof, and the blade members are made of an elastic material.

10. A belt cleaner as defined in claim 9 wherein the elastic material is rubber.

11. A belt cleaner as defined in claim 9 wherein the ceramic tiles of the two blade members are oriented toward the upstream side with respect to the direction of travel of the belt.

12. A belt cleaner as defined in claim 9 wherein the ceramic tile joints of one of the blade members are out of register with the ceramic tile joints of the other blade member longitudinally of the blade members.

13. A belt cleaner as defined in claim 9, wherein said tubular guides have a circular cross section, and wherein said horizontal tube is made of rubber.

14. A belt cleaner as defined in claim 3 or claim 8, wherein a dust-resistant cover is attached to the shank so as to cover a clearance between the shank and the guide surface.

15. A belt cleaner for a belt conveyor comprising:

two vertical blade members each having at its upper end a scraper blade to be pressed against the lower surface of the belt at the starting end of a return path of travel of the belt, wherein each scraper blade comprises a plurality of ceramic tiles arranged along the upper end of each blade member on one surface thereof, and each blade member is made of an elastic material;

means for holding the blade member upwardly and downwardly movably as opposed to and spaced apart by a predetermined distance from each other in the direction of travel of the belt;

means for applying pressure to the blade members held by the holding means, the pressure applying means having a hollow elastic body; and means for supplying a pressure fluid to the interior of the elastic body under variable pressure;

wherein the ceramic tiles of the blade member positioned upstream with respect to the direction of travel of the belt are oriented toward the upstream side, and the ceramic tiles of the downstream blade member are oriented toward the downstream side.

* * * * *

UNITED STATES PATENT AND TRADEMARK OFFICE
CERTIFICATE OF CORRECTION

PATENT NO. : 5,213,197
DATED : May 25, 1993
INVENTOR(S) : Toyoshige Mohri

It is certified that error appears in the above-indentified patent and that said Letters Patent is hereby corrected as shown below:

On the Title Page, Item [22], "December 14, 1991" should read
--November 14, 1991--.

Signed and Sealed this

Thirty-first Day of May, 1994

Attest:

BRUCE LEHMAN

*Attesting Officer*  *Commissioner of Patents and Trademarks*